UNITED STATES PATENT OFFICE.

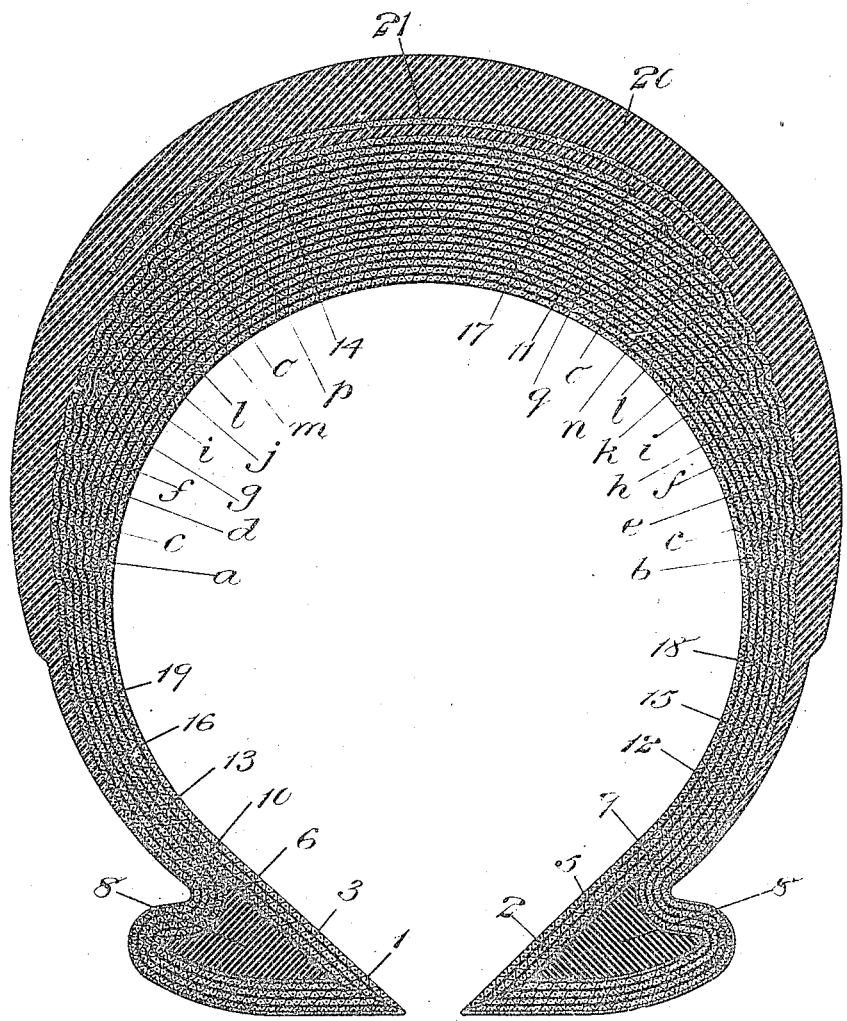

EDWARD C. SEWARD, JR., OF NEW YORK, N. Y., ASSIGNOR TO EUREKA TIRE COMPANY, OF TRENTON, NEW JERSEY, A CORPORATION OF NEW JERSEY.

VEHICLE-TIRE.

1,165,631.   Specification of Letters Patent.   Patented Dec. 28, 1915.

Application filed June 6, 1913.  Serial No. 772,147.

*To all whom it may concern:*

Be it known that I, EDWARD C. SEWARD, Jr., a citizen of the United States, and resident of the borough of Brooklyn, in the city and State of New York, have invented a new and useful Improvement in Vehicle-Tires, of which the following is a specification.

This invention relates to vehicle tires and more particularly to the outer casings for pneumatic tires.

One object is to provide an article of this character which will have greater strength and puncture proof qualities, without the use of special material and without decreasing the resiliency or materially increasing the internal friction, than has heretofore been known.

Another object is to provide a tire of this character which will be standard throughout its inner portion, including the margins, but in which the fabric layers are so arranged that the outer portion is of such extraordinary strength that it will resist to a great extent the tendency to flatten under the weight of the vehicle, and therefore will decrease the area of contact between the road surface and the tire, and hence increase the efficiency of the motive power used for propelling the vehicle.

Other objects are to provide certain improvements in the form, construction and arrangement of the several parts whereby the above mentioned objects may be effectively carried out.

These outer casings for pneumatic tires are commonly composed of a fabric carcass, which consists of layers of rubber impregnated fabric, and an outer cover or tread of rubber compound. The margins of these casings are made of a standard size for a given size tire, in order that they may always fit the standardized wheel rims, and it has been found impractical to incorporate more than a given number of layers or plies of fabric in a casing of a given size, owing to the excessive increase in the stiffness of the tire, thus reducing resiliency; and the excessive increase in the internal friction, thus reducing the efficiency of the motor; and also owing to the fact that such increase in the number of layers of fabric requires a decrease in the cross sectional size of the cores which form the shape of the margins, in order that the said margins may not be too large for engagement with the standard wheel rims.

By the arrangement I have conceived, and which constitutes my invention, it is practical to obtain the beneficial effects (viz: strength, puncture resistance, and non-flattening), incidental to the incorporation of more than two and one half times as many layers of fabric as is customary or practical to incorporate in a standard casing of a given size, without decreasing the resiliency, materially increasing the internal friction, changing the construction of the margins or beads, or consuming a correspondingly greater amount of fabric.

A practical embodiment of the invention is represented in the accompanying drawing which shows an enlarged cross section of a completed clencher casing.

In making this tire casing, I preferably apply the first strip or layer of fabric, denoted by 1, about an appropriate core or mandrel in the usual manner, the layer 1 extending completely about the mandrel from side to side so that it will reach from margin to margin in the completed tire. This layer 1 may be stretched on the mandrel as is customary. In applying the next layer or ply, 2, there is utilized a strip somewhat narrower than has heretofore been used, and it is superposed upon the layer 1, with one edge of the layer 2 adjacent to one edge of the layer 1, (indicated on the right hand side of the drawing), but with the other edge of the layer 2 extending only about half way down the opposite side of the layer 1; this point of termination of the layer 2 being denoted in the drawing by the letter *a*. After the layer 2 has been thus applied, a fabric layer 3, of substantially the same width as the layer 2, is superposed on the layers 1 and 2; one edge of the layer 3 being substantially even with the edge of the layer 1 to which the layer 2 did not extend, (this edge being indicated at the left in the drawing), and the other edge of the layer 3 extending down in the opposite side of the tire, to a point substantially opposed to the terminus of the layer 2, which point of termination of the layer 3 is indicated by *b*.

After the layer 3 has been placed in position, I incorporate a narrower layer 4, composed of similar rubber impregnated fabric, which layer 4 rests upon the outer portion of the layer 3, and has its edges terminating a little above the center point in the sides of the tire, and slightly above the points of termination $a\ b$, the termini of the edges of the layer 4 being denoted by $c\ c$. The next step is to place two more layers of fabric 5 and 6 in the same manner that the layers 2 and 3 were placed, the layer 5 starting at the left hand margin and terminating at a point denoted by $d$ in the opposite side, above the points $a\ c$; and the layer 6 starting at the left hand margin and terminating at a point, denoted by $e$, in the opposite side of the tire corresponding to the point $d$, and above the points $b\ c$. Following this, another narrow layer of fabric 7, is placed on top of the outer portion of the layer 6, in a manner similar to the locating of the layer 4; but this layer 7 is narrower than the layer 4, and its edges terminate at points denoted by $f\ f$, which are above the points $d\ e$ in the sides of the tire. The construction of the tire is now continued by incorporating the well known bead cores 8, 8, at the margins, and two more layers of fabric 9 and 10 are built into the tire in the same manner as in the case of the layers 2, 3 and 5, 6, except that these layers extend over the bead cores 8. The layer 9 begins at the right hand margin in the drawing, and its outer edge terminates at a point denoted by $g$ in the other side of the tire; while the layer 10 begins at the left hand margin and its other edge terminates at a point denoted by $h$. Another narrow strip of fabric 11 is now placed upon the outer portion of the layer 10, in the same manner as the strips 4 and 7, with its edges terminating at points denoted by $i\ i$. This is followed by two more layers 12, 13, which are incorporated in the same manner as the layers 2, 3; 5, 6 and 9, 10, the layer 12 starting at the right hand margin and terminating at the point $j$, and the layer 13, starting from the left hand margin and terminating at the point $k$. Again, another narrow strip of fabric 14 is located in the same manner as the strips 4, 7 and 11, its edges terminating at points denoted by $l\ l$. Two more layers of fabric 15, 16, are now incorporated, the layer 15 starting at the right hand margin and terminating at the point $m$; and the layer 16 starting at the left hand margin and terminating at the point $n$. These layers 15, 16, are followed by another narrow strip of fabric 17, which is placed upon the outer part of the layer 16, its edges terminating at points denoted by $o\ o$. The tire carcass proper, is now completed by the addition of two more layers of fabric 18, 19, the layer 18 starting at the right hand margin and terminating at the point $p$, and the layer 19 starting at the left hand margin and terminating at the point $q$. The tire may now be finished by the addition of the tread or cover 20, with, if desired, the customary breaker strip 21.

It will be understood that the layers or strips of fabric are of suitable material cut on the bias and properly impregnated or coated with a vulcanizable rubber compound; and that the tread or cover may be composed of a suitable rubber compound and the breaker strip of suitable fabric. After the tire has been thus completed, it may be vulcanized by any desired method, but I prefer the so-called one cure wrapped tread process.

It will be evident from the above description taken in connection with the drawings, that the inner body portion, or substantially the inner half of the tire casing, including the beads or margins, is of exactly the same size, shape and construction as the standard "seven ply" clencher casing, while the outer body portion, including the tread, is greatly thickened and strengthened by the overlapping of the edges of the fabric layers 2, 3, 5, 6, 9, 10, 12, 13, 15, 16, 18, 19, and by the interpositioning of the narrow strips or layers of fabric 4, 7, 11, 14, 17; this thickness of the carcass increasing as the extreme tread portion is approached, the increase being substantially uniform. I thus obtain a casing which, in its inner side walls and margins, has exactly the same size and shape and resiliency as a regular "seven ply" clencher casing, but its outer portion, which receives the greatest strain and shocks from contact with the road surface, is more than two and one-half times as thick and strong as the corresponding part of a standard seven ply clencher casing. Furthermore, owing to the fact that none of the plies of fabric, except the first layer 1, extends transversely throughout the tire from margin to margin, it is not necessary to stretch the peripheral portion of these plies of fabric to anything like the extent required in the ordinary tire casings, and hence the enormous internal friction which is invariably generated in the outer body portion of such casing while the vehicle is in motion, is so greatly decreased, that the great increase in the thickness of the tread portion of the carcass of the casing is permissible without any increase in the internal friction. As mentioned above, this great thickness of the outer body portion also tends to prevent the flattening of the tread portion of the tire under load, and hence tends to minimize the area of contact between the tire and road surface, thereby lessening the friction and rendering more efficient the motive power provided for the propulsion of the vehicle.

While I have explained this invention in connection with a seven ply clencher casing, I desire it to be understood that the invention is applicable to any size or character of casing, the same principle being applicable throughout. Furthermore, I do not intend to limit myself to any particular kind or character of fabric, or to any particular number of strips, or to any specific arrangements of the strips of fabric, or to any other details of the invention except as they may be specifically set forth in the claims, as I am aware that various changes may be resorted to in the form, construction and arrangement of the several components of the tire without departing from the spirit and scope of my invention.

What I claim is:—

1. An open bellied tire comprising peripherally disposed sheets of fabric, some of said sheets being arranged in pairs, the sheets of each pair being juxtaposed and having a transverse extent from opposite margins of the tire to terminating points in opposite side walls above the margins, whereby said sheets overlap in the tread portion of the tire, said pairs of sheets being graduated in width so that the sheets of each succeeding outer pair have less transverse extent than the sheets in the preceding pair, the others of said sheets being arranged intermediate each of said pairs and having a transverse extent to neither margin of the tire.

2. An open bellied tire comprising peripherally disposed sheets of fabric, some of said sheets being arranged in pairs, the sheets of each pair being juxtaposed and having a transverse extent from opposite margins of the tire to terminating points in opposite side walls above the margins, whereby said sheets overlap in the tread portion of the tire, said pairs of sheets being graduated in width so that the sheets of each succeeding outer pair have less transverse extent than the sheets in the preceding pair, the others of said sheets being arranged intermediate each of said pairs and having a transverse extent to neither margin of the tire, said last mentioned sheets being progressively narrower as they approach the outer portion of the tire.

3. An open bellied tire comprising peripherally disposed sheets of fabric, each third sheet having its circumferential central portion lying in the same radial plane with respect to the cross section of the tire as the said portion of each adjacent third sheet, and the sheets intermediate said third sheets having their circumferential central portions lying in different planes with respect to the cross section of the tire from each other and from the said portion of the said third sheets.

4. An open bellied tire comprising peripherally disposed sheets of fabric, each third sheet having its circumferential central portion lying in the same radial plane with respect to the cross section of the tire as the said portion of each adjacent third sheet, and the sheets intermediate said third sheets having their circumferential central portions lying in different planes with respect to the cross section of the tire from each other and from the said portion of the said third sheets, the said planes in which the said portions of the intermediate sheets lie being at the same angle with respect to the said plane in which the said portion of the adjacent third sheets lie.

In testimony, that I claim the foregoing as my invention I have signed my name in presence of two witnesses, this fifth day of June, 1913.

EDWARD C. SEWARD, Jr.

Witnesses:
F. George Barry,
Henry C. Thieme.